United States Patent
Nakagawa et al.

(10) Patent No.: US 9,522,470 B2
(45) Date of Patent: Dec. 20, 2016

(54) HUMAN-COOPERATIVE INDUSTRIAL ROBOT WITH LEAD-THROUGH FUNCTION

(71) Applicant: FANUC Corporation, Yamanashi (JP)

(72) Inventors: Hiroshi Nakagawa, Yamanashi (JP); Takatoshi Iwayama, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 77 days.

(21) Appl. No.: 14/681,916

(22) Filed: Apr. 8, 2015

(65) Prior Publication Data
US 2015/0290809 A1    Oct. 15, 2015

(30) Foreign Application Priority Data

Apr. 9, 2014 (JP) ................ 2014-080164

(51) Int. Cl.
*B25J 9/18* (2006.01)
*B25J 9/16* (2006.01)
*B25J 13/08* (2006.01)

(52) U.S. Cl.
CPC ............. *B25J 9/1676* (2013.01); *B25J 13/085* (2013.01); *G05B 2219/36429* (2013.01); *G05B 2219/40198* (2013.01); *G05B 2219/40201* (2013.01); *G05B 2219/49147* (2013.01)

(58) Field of Classification Search
CPC ....... B25J 9/1676; B25J 9/1694; B25J 9/1674; B25J 13/085; B25J 19/063; G05B 2219/40198; G05B 2219/40201; G05B 2219/36429; G05B 2219/49147
See application file for complete search history.

(56) References Cited

FOREIGN PATENT DOCUMENTS

| JP | S59-157715 A | 9/1984 |
| JP | H09-150382 A | 6/1997 |
| JP | 2006-021287 A | 1/2006 |

OTHER PUBLICATIONS

Stolka et al., "A Hybrid Force Following Controller for Multi-Scale Motions," Sep. 2003, SYROCO 2003—7th International Symposium on Robot Control.*

* cited by examiner

*Primary Examiner* — Spencer Patton
(74) *Attorney, Agent, or Firm* — Hautpman Ham, LLP

(57) ABSTRACT

A human-cooperative industrial robot includes a contact force detection part configured to detect a contact force applied to the robot when an operator and a robot come in contact with each other, a contact force monitoring part configured to either stop the robot or make the robot retreat in a direction in which the contact force is reduced if the contact force exceeds a predetermined threshold value, and an operation force detection part configured to detect an operation force applied to the robot when the lead-through operation is implemented. The robot also includes a lead-through switch for switching between the states of enabling and disabling the lead-through operation. When the lead-through operation is enabled, the contact force monitoring is disabled, and when the lead-through operation is disabled, the contact force monitor is enabled.

5 Claims, 3 Drawing Sheets

HUMAN-COOPERATIVE INDUSTRIAL ROBOT WITH LEAD-THROUGH FUNCTION

RELATED APPLICATIONS

The present application claims priority to Japanese Application Number 2014-080164, filed Apr. 9, 2014, the disclosure of which is hereby incorporated by reference herein in its entirety.

BACKGROUND OF THE INVENTION

1. Field of the Invention

The present invention relates to a human-cooperative industrial robot.

2. Description of the Related Art

In general, in order to ensure the safety of operators, industrial robots operate in an area enclosed by a safety fence which limits the entry of operators. However, recently the demand for human-cooperative robots which are configured to operate in close proximity to operators is rising. In the case of human-cooperative robots, as contact between the robot and an operator may be dangerous, the robot is configured with a sensor which can detect whether or not contact has been made between the robot and the operator. For example, a force sensor may be used to detect a contact force applied to the robot. If the detected value is greater than a specified threshold value, the robot is stopped in order to ensure the safety of the operator.

JP2006-21287A discloses a robotic system equipped with a contact force detector which detects a contact force applied to any place on a robotic arm. In this robotic system, the robot moves to avoid the detected contact force, thus preventing further harm to people or objects surrounding the robot.

In some human-cooperative robots, a lead-through operation is performed in which a position of a robot is taught manually by an operator. For example JP S59-157715 A discloses a teaching method whereby a robot is directly taught based on signals output from a force sensor. Further, JP H9-150382 A discloses a direct teaching device which is configured such that it is possible to implement direct teaching only when a servo power supply retaining switch provided on a simple teaching device and an operable button provided on a handle for teaching are both pressed.

FIG. 5 illustrates a robot 100 according to an existing related technology. The robot 100 is provided with a wrist 102 with a handle 110 which can be manipulated by an operator when lead-through operation is implemented. Moreover, the wrist 102 is further equipped with a force sensor 120 which can detect the force of the manipulation applied to the handle 110. The operator can implement lead-through operation by operating the teaching control panel 140 which is connected to the robot controller 130.

The teaching control panel 140 is provided with a servo enable switch 142. When the servo enable switch 142 is pressed continuously for a specified period of time, the servo power supply source is switched on, thereby putting the robot in an operable state. Further, when the pressing force is released, the servo power supply source is switched off and the robot's movement is stopped. On the other hand, the handle 110 has a lead-through enable switch 112 which is used to switch between an enabled state in which the lead-through operation is enabled and a disabled state in which the lead-through operation is disabled. Namely, while the servo enable switch 142 is pressed to switch the servo power supply source on, if the lead-through enable switch 112 is pressed for a specified period of time, the lead-through operation is enabled, and when the pressing force is released, the lead-through operation is disabled.

In the related art described with reference to FIG. 5, the lead-through operation cannot be performed unless both the servo enable switch 142 and the lead-through enable switch 112 are pressed at the same time. Since the weight of the teaching control panel 140 is not necessarily light, and both hands of the operator are used to simultaneously operate two switches, the burden during operating tends to be great. This reduces operational efficiency, and may also cause operational errors.

Further, if a safety unit is provided so as to stop the robot when the contact force between the robot and an operator exceeds a threshold value, it is preferable that the threshold value is sufficiently small so as to ensure the safety of operators. However, if the threshold value is too small, the robot may be unintentionally stopped when the manipulation force applied by an operator exceeds the threshold value during lead-through operation.

Therefore, there is a need for a human-cooperative industrial robot which lightens the burden of an operator when performing lead-through operation while ensuring the safety of the operator.

SUMMARY OF THE INVENTION

According to a first aspect of the present invention, there is provided a human-cooperative industrial robot configured to share a work space with an operator, comprising: a lead-through implementation part configured to implement a lead-through operation in which a position and posture of the robot are changed in response to an operation force applied on the robot by the operator; an operation force detection part configured to detect an operation force applied to the robot when the lead-through operation is implemented; a lead-through switch configured to enable the lead-through operation when a pressing force is applied on the lead-through switch and disable the lead-through operation when the pressing force is released from the lead-through switch; a contact force detection part configured to detect a contact force applied to the robot when the operator and the robot come in contact with each other; and a contact force monitoring part configured to stop the robot or make the robot retreat in a direction in which the contact force is reduced when the contact force exceeds a predetermined threshold value, wherein when the lead-through operation is enabled, the contact force monitoring part is disabled, and when the lead-through operation is disabled, the contact force monitoring part is enabled.

According to a second aspect of the present invention, in the industrial robot according to the first aspect, the operation force detection part is configured to detect the operation force by a force sensor which is attached to a wrist of the robot.

According to a third aspect of the present invention, in the industrial robot according to the first or second aspect, the contact force detection part is configured to detect the contact force by a force sensor which is attached to an immovable part of the robot or by torque sensors which are respectively attached to at least three drive shafts of the robot.

According to a fourth aspect of the present invention, in the industrial robot of the first aspect, the contact force detection part is configured to detect the contact force by a force sensor which is attached to an immovable part of the robot or torque sensors which are respectively attached to at least three drive shafts of the robot, and the operation force detection part is configured to detect the operation force by the force sensor or the torque sensors.

According to a fifth aspect of the present invention, in the industrial robot according to any of the first to fourth aspects, the robot comprises a hand configured to releasably hold a workpiece and attached to a wrist, and a hand manipulation switch is attached to the robot, to the hand or to the surrounding of the robot and configured to control the hand so as to switch between a holding state and a releasing state.

These and other objects, features and advantages of the present invention will become more apparent in light of the detailed description of exemplary embodiments thereof as illustrated in the drawings.

DETAILED DESCRIPTION OF THE INVENTION

Figure 1:
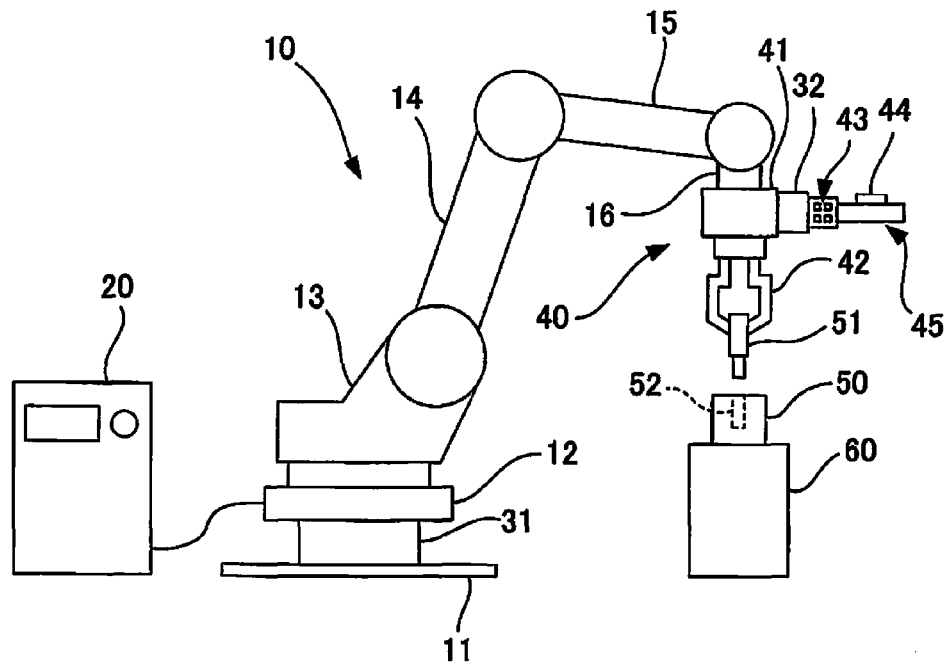
FIG. 1 is a schematic view illustrating the entire configuration of a robot according to one embodiment.

Hereinafter, embodiments of the present invention will be described referring to the drawings. The constitutional elements of the illustrated embodiments may be modified in size in relation to one another as necessary to facilitate the understanding of the present invention. The same reference numerals are used for the same or corresponding constitutional elements over the drawings.

FIG. 1 illustrates the entire configuration of a robot 10 according to one embodiment. The robot 10 is a human-cooperative industrial robot which operates in the same workspace as an operator (hereinafter referred to simply as "robot"). The illustrated robot 10 is a vertical six-joint articulation robot, but can be of any type with a known configuration, including for example, a scalar type or parallel link type robot.

The robot 10 is placed on a fixed plate 11 which is fixed to the floor. The robot 10 includes a robot base 12, a body part 13 rotatably attached to the robot base 12, a lower arm 14 rotatably attached to the body part 13 at one end, an upper arm 15 rotatably attached to the other end of the lower arm 14 on the opposite side of the body part 13 and a wrist 16 rotatably attached to the upper arm 15.

Each rotational shaft of the robot 10 is driven by a servo motor (not illustrated) which is controlled by a robot controller 20. The wrist 16 is further affixed with an end effector 40. The robot 10 is designed to perform various processes such as assembling, welding and cutting of components, depending on the type of end effector 40. This type of robotic configuration and function is well known so a detailed description will be omitted in the present specification.

The robot 10 is provided with a force sensor 31 (hereinafter referred to as "the first force sensor") between the fixed plate 11 and the robot base 12. The first force sensor 31 is designed to be able to detect a force applied on any portion of each component of the robot 10 (for example, the robot base 12, the body part 13, the lower arm 14, the upper arm 15 or the wrist 16). For example, a force applied on the upper arm 15 is transmitted through the lower arm 14, the body part 13 and the robot base 12 and is detected by the first force sensor 31. In this way, the first force sensor 31 can detect a contact force generated by the robot 10 coming in contact with an operator during its operation.

If the detected contact force exceeds a predetermined threshold value, the robot 10 is either stopped or is made to retreat in a direction in which the contact force is reduced. The function of stopping or retreating the robot 10 in accordance with the detection result of the contact force is referred to as "contact force monitoring" in the present specification.

The illustrated robot 10 is used to perform an insertion process to insert a component 51 into a workpiece 50. The end effector 40 may be provided with, for example, a hand 42 attached to the wrist 16 via an adaptor 41. The hand 42 may be, for example, a hydraulically or electrically driven hand, and is configured to be able to releasably hold the component 51. For example, the component 51 is dimensioned so that it can be inserted into an insertion hole 52 of the workpiece 50 which is placed on a work table 60. The robot 10 is driven to change the position and posture of the component 51 which is held by the hand 42. The robot 10 moves the component 51 a position near the insertion hole 52 of the workpiece 50 and performs an insertion step through a lead-through operation thereafter.

As illustrated in FIG. 1, the adaptor 41 attached to the wrist 16 is provided with a force sensor 32 (hereinafter referred to as "the second force sensor") which detects an operation force applied by an operator during the lead-through operation. The second force sensor 32 is provided between the adaptor 41 and a lead through handle 45.

The operator performs the lead-through operation on the robot 10 by manipulating the lead-through handle 45. The second force sensor 32 can detect the operation force applied by the operator. The robot 10 changes the position and posture of the component 51 by driving the servo motors of the respective rotary shafts individually corresponding to the magnitude and the direction of the operation force detected by the second force sensor 32. According to this lead-through operation, the operator inserts the component 51 into the insertion hole 52 of the workpiece 50 while finely adjusting the position and posture of the component 51.

The lead-through handle 45 is provided with a function switch 43. For example, the function switch 43 includes a handle operation switch, a translation switch, a rotation switch, a speed change switch and a position teaching switch. The hand operation switch is, for example, used to open and close the hand 42. For example, the operator can release the holding force of the hand 42 by operating the hand operation switch once the component 51 is positioned in a predetermined position relative to the workpiece 50.

The translation switch is used to change only the position of the component 51 without changing the posture thereof. In contrast, the rotation switch is used to change only the posture of the component 51 without changing the position thereof. Depending on the positional relationship between the component 51 and the workpiece 50, it may be desirable to only translate or only rotate the component 51.

The speed change switch is, for example, used to move the robot 10 at a low speed during the lead-through operation. Therefore, for example, when the speed change button is pressed to turn the speed change function on, even if the operation force is of the same level, the robot 10 will move at a lower speed. This kind of function may be used when a further level of accuracy is desired as in an operation immediately before the component 51 is inserted into the insertion hole 52 of the workpiece 50.

The position teaching switch is used to input the position and posture of the robot which have been changed through the lead-through operation as teaching points of a operation program of the robot. The inputted teaching points may be used to create or change the operation program for the robot. It should be noted that the function switch 43 may be further provided with other switches having different functions from those described above as necessary, or alternatively one or more of the above-mentioned switches may be omitted.

The lead-through handle 45 is further provided with a lead-through switch 44. The lead-through switch 44 is used to switch between an enabled state in which the lead-through operation is enabled and a disabled state in which the lead-through operation is disabled. Specifically, the lead-through switch 44 is configured such that the lead-through operation is switched on when a pressing force is applied on the lead-through switch 44 by an operator, and that the lead-through operation is switched off when the pressing force is released. Namely, it is necessary for the operator to continuously press the lead-through switch 44 during the lead-through operation.

According to the present embodiment, when the lead-through operation is enabled with the lead-through switch 44 being pressed, the contact force monitoring is disabled. On the other hand, when the pressing force is released and the lead-through operation is disabled, the contact force monitoring is enabled. This will be further described below.

Figure 2:
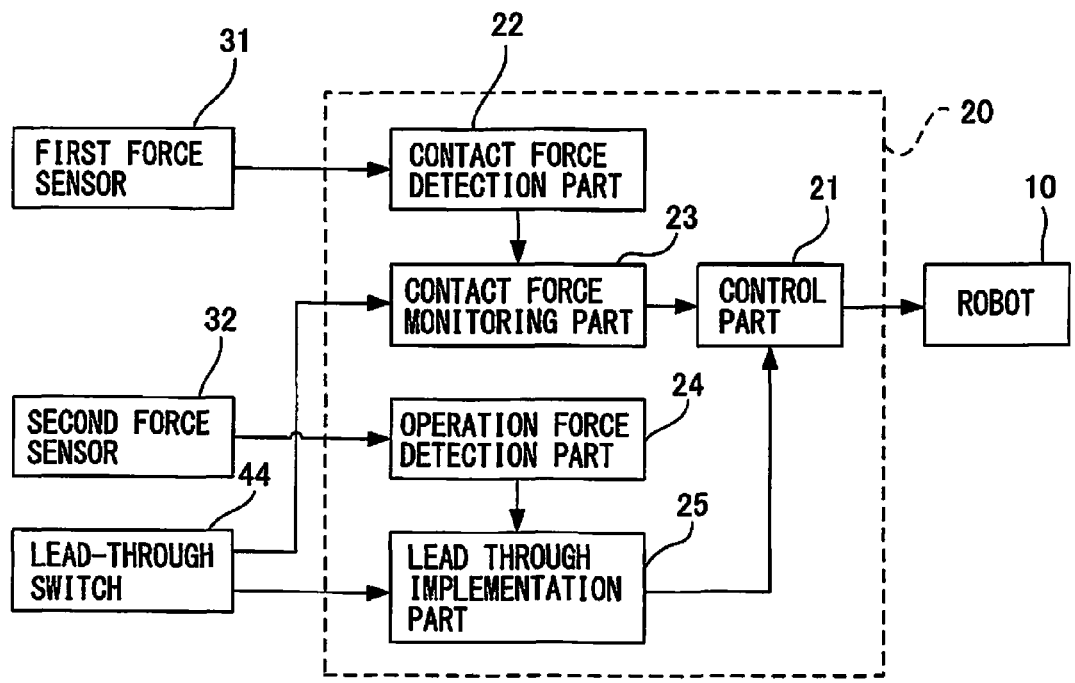
FIG. 2 is a functional block diagram of a robot controller according to one embodiment.

FIG. 2 is a functional block diagram of the robot controller 20 according to one embodiment. As illustrated, the robot controller 20 includes a control part 21, a contact force detection part 22, a contact force monitoring part 23, an operation force detection part 24, and a lead-through implementation part 25.

The control part 21 sends an operation command to the robot 10. The control part 21 controls the robot 10, for example, in accordance with a predetermined control program or the operation force during the lead-through operation. When the contact force monitoring is active, the control part 21 outputs a stop command to stop the robot or a retreat command to make the robot retreat in a direction to decrease the contact force, depending on the magnitude of the detected contact force. When the lead-through operation is enabled, the control part 21 outputs an operation command to drive the robot 10 in cooperation with the lead-through implementation part 25 according to the magnitude and the direction of the operation force.

The contact force detection part 22 detects a contact force acting between the robot 10 and the operator, by the first force sensor 31. The detected contact force is outputted to the contact force monitoring part 23.

The contact force monitoring part 23 monitors the contact force acting between the robot 10 and the operator and determines whether or not the contact force is greater than a predetermined threshold value. If the contact force is greater than the threshold value, the control part 21 stops the robot 10 or makes the robot 10 retreat in a direction in which the contact force is reduced. In this way, when a contact force which may injure the operator is detected, the robot 10 stops or retreats to reduce the contact force, thereby ensuring the safety of the operator. The contact force monitoring part 23 is activated when the lead-through switch 44 is turned off. It should be noted that since the contact force monitoring part 23 does not distinguish the operator and any other objects in the vicinity of the robot 10 from one another, the robot 10 can be prevented from coming in contact with the operator and the objects in the vicinity of the robot 10.

The operation force detection part 24 detects the operation force applied to the lead-through handle 45 when an operator performs lead-through operation.

The lead-through implementation part 25 implements the lead-through operation according to the operation force applied to the lead-through handle 45 by the operator. Namely, the lead-through implementation part 25 cooperates with the control part 21 to generate an operation command which is determined in accordance with the magnitude and the direction of the operation force. The lead-through implementation part 25 is activated when the lead-through switch 44 is switched on.

Figure 3:
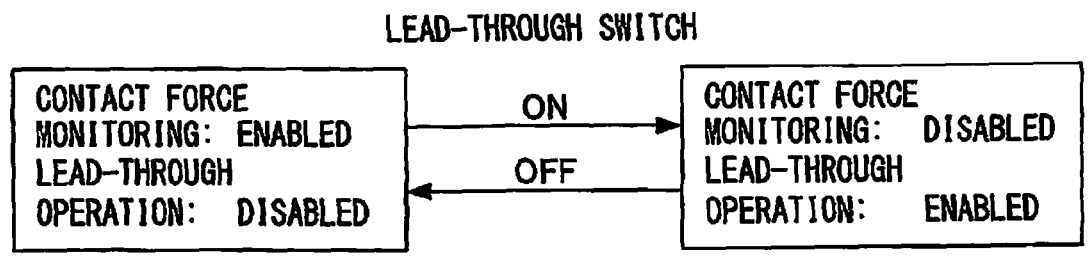
FIG. 3 is a block diagram illustrating a relationship between contact force monitoring operation and lead-through operation.

FIG. 3 illustrates a relationship between the contact force monitoring and the lead-through operation. According to the present embodiment, when one of the contact force monitoring and the lead-through operation is enabled, the other is disabled. Namely, when the contact force monitoring is enabled, the lead-through operation is disabled. On the other hand, when the lead-through operation is enabled, the contact force monitoring is disabled. Moreover, the lead through switch 44 is operated to switch these two states.

According to the present embodiment, the following effects may be obtained.

(1) When the lead-through operation is implemented, the lead-through switch 44 is pressed and the contact force monitoring is disabled. Therefore, the robot can be prevented from stopping unintentionally due to an operation force applied to the robot 10 by the operator during the lead-through operation. On the other hand, if the operator feels a sense of danger during the lead-through operation, he/she releases the pressing force on the lead-through switch 44 to enable the contact force monitoring again. Thereby collisions between the robot and the operator can be prevented.

(2) After completing the lead-through operation, by switching the lead-through switch 44 off, the contact force monitoring is immediately enabled. Therefore, the safety of the operators near the robot 10 is ensured immediately after the lead-through operation.

Figure 5:
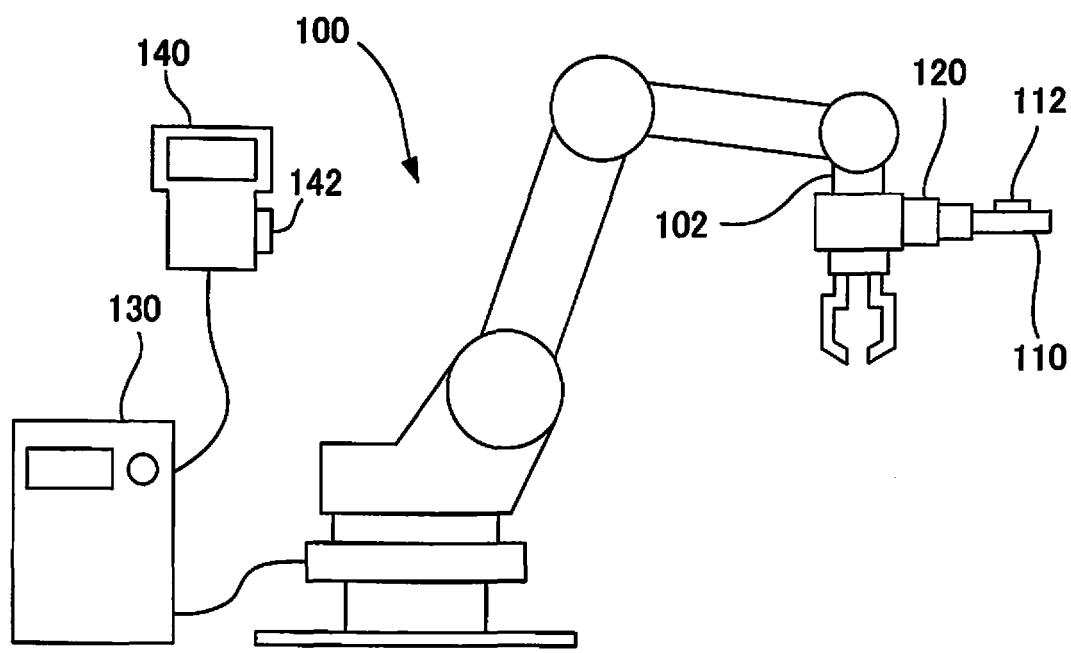
FIG. 5 is a schematic view illustrating the entire configuration of a robot according to the related art.

(3) It is only necessary to operate the lead-through switch 44 in order to enable the lead-through operation. Therefore, as described above with reference to FIG. 5, there is no need to press both the servo enable switch and the lead-through enable switch simultaneously. This reduces the burden on an operator during the lead through operation and the operating efficiency can be improved.

(4) Since the contact force monitoring is switched on after the pressing force has been released from the lead-through switch 44, electric power supplied to the servo motor is not shut off. Therefore, even if an operator releases his/her grip for a moment from the lead-through switch 44 during the lead-through operation, there is no need to restart the servo power supply source and the lead-through operation can be quickly restarted.

(5) The second force sensor 32 which detects the operation force is provided farther toward the tip side than the wrist 16 of the robot 10. Namely, the second force sensor 32 is provided near the lead-through handle 45 to which the operation force is applied. Therefore, the operation force can be accurately detected.

(6) Since the function switch 43 is provided farther toward the tip side than the wrist 16 of the robot 10, the operator can easily operate the function switch 43 and therefore the operational efficiency can be improved.

Figure 4:
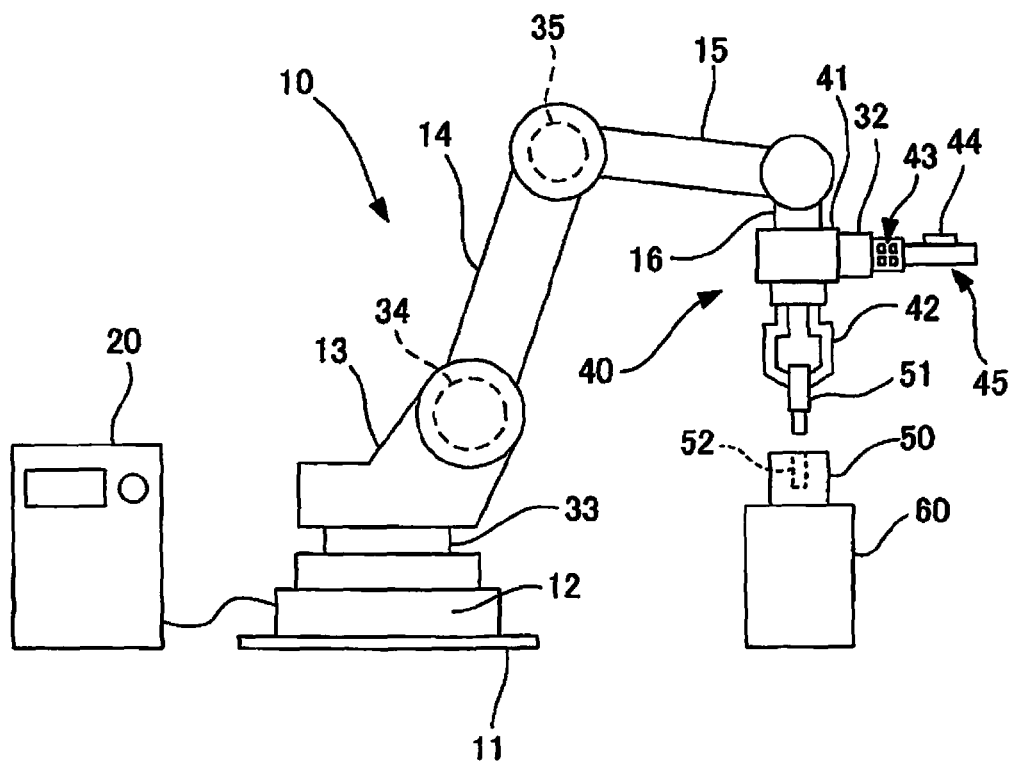
FIG. 4 is a schematic view illustrating the entire configuration of a robot according to another embodiment.

FIG. 4 illustrates the entire configuration of a robot 10 according to another embodiment. This embodiment differs from the embodiment illustrated in FIG. 1 in that three torque sensors 33, 34 and 35 are employed, instead of the first force sensor 31. The first torque sensor 33 is provided between the robot base 12 and the body part 13 to detect the torque around the rotary axis of the body part 13. The second torque sensor 34 detects the torque around the joint between the body part 13 and the lower arm 14. The third torque sensor 35 detects the torque around the joint between the lower arm 14 and the upper arm 15.

The torque values obtained from the torque sensors 33, 34 and 35 are associated with the posture of the robot 10, and are used to calculate the contact force acting between the robot 10 and the operator. The calculated contact force is used for the purpose of the contact force monitoring as in the above-described embodiment. Although not illustrated, an additional torque sensor may also be provided, for example, on the wrist 16.

Further, in the robot 10 illustrated in FIG. 1, the first force sensor 31 may also be used to detect an operation force during the lead-through operation. In the same way, in the robot 10 illustrated in FIG. 4, the torque sensors 33, 34 and 35 may also be used to detect the operation force during the lead-through operation. In these cases, the contact force during the contact force monitoring and the operation force during the lead-through operation can be detected by the common force sensor. Therefore, it is unnecessary to provide the second force sensor 32 and costs can be reduced.

In the above-described embodiments, the function switch 43 is provided on the lead-through handle 45, but it may be provided on the wrist 16 of the robot 10 or farther toward the robot main body side than the wrist 16, for example, on the upper arm 15 or the lower arm 14. Alternatively, the function switch 43 may be provided near the robot 10, but independently of the robot 10. Further, an emergency stop button for forcibly shutting off the servo power supply force may be provided on the wrist 16 of the robot 10 or nearby.

EFFECT OF THE INVENTION

According to the robot having the above-described configuration, the lead-through operation can be switched between an enabled state and a disabled state through the operation of the lead-through switch. Further, when the lead-through operation is enabled, the contact force monitoring is disabled and when the lead-through operation is disabled, the contact force monitoring is enabled. Namely, by operating a common switch, only one of the contact force monitoring and the lead-through operation is enabled, therefore the burden on an operator can be reduced and the operational efficiency can be improved. Further, if an operator feels a sense of danger, he/she releases the pressing force from the lead-through switch to enable the contact force monitoring. Therefore, the operator's safety can be ensured.

Although various embodiments and variants of the present invention have been described above, it is apparent for a person skilled in the art that the intended functions and effects can also be realized by other embodiments and variants. In particular, it is possible to omit or replace a constituent element of the embodiments and variants, or additionally provide a known means, without departing from the scope of the present invention. Further, it is apparent for a person skilled in the art that the present invention can be implemented by any combination of features of the embodiments either explicitly or implicitly disclosed herein.

What is claimed is:

1. A human-cooperative industrial robot configured to share a work space with an operator, comprising:
    a lead-through implementation part configured to implement a lead-through operation in which a position and posture of the robot are changed in response to an operation force applied on the robot by the operator;
    an operation force detection part configured to detect an operation force applied to the robot when the lead-through operation is implemented;
    a lead-through switch configured to enable the lead-through operation when a pressing force is applied on the lead-through switch and disable the lead-through operation when the pressing force is released from the lead-through switch;
    a contact force detection part configured to detect a contact force applied to the robot when the operator and the robot come in contact with each other; and
    a contact force monitoring part configured to stop the robot or make the robot retreat in a direction in which the contact force is reduced when the contact force exceeds a predetermined threshold value,
    wherein when the lead-through operation is enabled, the contact force monitoring part is disabled, and when the lead-through operation is disabled, the contact force monitoring part is enabled.

2. The industrial robot according to claim 1, wherein the operation force detection part is configured to detect the operation force by a force sensor which is attached to a wrist of the robot.

3. The industrial robot according to claim 1, wherein the contact force detection part is configured to detect the contact force by a force sensor which is attached to an immovable part of the robot or by torque sensors which are respectively attached to at least three drive shafts of the robot.

4. The industrial robot according to claim 1, wherein the contact force detection part is configured to detect the contact force by a force sensor which is attached to an immovable part of the robot or torque sensors which are respectively attached to at least three drive shafts of the robot, and
    the operation force detection part is configured to detect the operation force by the force sensor or the torque sensors.

5. The industrial robot according to claim 1, wherein the robot comprises a hand configured to releasably hold a workpiece and attached to a wrist, and
    a hand manipulation switch is attached to the robot, to the hand or to the surrounding of the robot and configured to control the hand so as to switch between a holding state and a releasing state.

* * * * *